United States Patent
Lin et al.

(10) Patent No.: US 7,998,439 B2
(45) Date of Patent: Aug. 16, 2011

(54) METHOD FOR SEPARATING AND RECYCLING URANIUM AND FLUORINE FORM SOLUTION

(75) Inventors: Chen-Te Lin, Tainan County (TW); Kuo-Hao Tsao, Taoyuan County (TW); Ben-Li Pen, Taoyuan County (TW)

(73) Assignee: Institute of Nuclear Energy Research, Taoyuan County (TW)

(*) Notice: Subject to any disclaimer, the term of this patent is extended or adjusted under 35 U.S.C. 154(b) by 0 days.

(21) Appl. No.: 12/655,343

(22) Filed: Dec. 29, 2009

(65) Prior Publication Data

US 2010/0316543 A1  Dec. 16, 2010

(30) Foreign Application Priority Data

Jun. 10, 2009 (TW) ............................... 98119463 A

(51) Int. Cl.
*C01G 56/00* (2006.01)
(52) U.S. Cl. .......... 423/11; 210/724; 210/725; 210/726; 210/727
(58) Field of Classification Search ............ 423/11; 210/724–727
See application file for complete search history.

(56) References Cited

U.S. PATENT DOCUMENTS

| 4,256,702 A | 3/1981 | Lyauder et al. |
| 4,769,180 A | 9/1988 | Echigo et al. |
| 6,419,832 B1 * | 7/2002 | Van De Steeg et al. ....... 210/682 |

OTHER PUBLICATIONS

J.A. Seneda, et al., Recovery of uranium from the filtrate of ammonium diuranate' prepared from uranium hexafluoride, Jrnl of Alloys & Compounds, 323-324, 2001, 838-841.

* cited by examiner

*Primary Examiner* — Melvin Mayes
*Assistant Examiner* — Melissa Stalder
(74) *Attorney, Agent, or Firm* — Hudak, Shunk & Farine Co. LPA

(57) ABSTRACT

A separation and recycling method for recycling uranium and fluoride from a waste liquid sequentially and separately is disclosed. The method comprises a uranium-recycling process and a fluoride-recycling process. In the uranium-recycling process, an alkali metal compound or monovalent cation and a coagulant aid are added into the waste liquid to promote the precipitation of uranium. In the fluoride-recycling process, an alkaline earth metal compound, a strong acid and a coagulant aid are added into the uranium-removed waste liquid to precipitate fluoride. By means of the method of the present invention, the uranium and fluoride contents of the uranium-removed and fluoride-removed waste liquid are compliant with the effluent standards of the environmental laws.

12 Claims, 5 Drawing Sheets

METHOD FOR SEPARATING AND RECYCLING URANIUM AND FLUORINE FORM SOLUTION

BACKGROUND OF THE INVENTION

1. Field of the Invention

The present invention relates to a separation and recycling method, in particular to a separation and recycling method for recycling uranium and fluoride from a waste liquid sequentially and separately.

2. Description of the Related Art

A waste liquid containing uranium and fluoride is generally produced in refineries for refining uranium mines, or laboratories of research centers, and these waste liquids are classified as radwaste liquors which are strictly controlled to protect ecological environments. In a traditional way of processing the waste liquid containing uranium and fluoride, a calcium salt ($Ca^{2+}$) is added to perform a chemical precipitate, such that the uranium will be coprecipitated in calcium fluoride ($CaF_2$) and cause a solid waste disposal or reuse issue. If a uranium-containing solid is buried in the same way as a radwaste, there will be a concern of a fluoride eroding a container, and the reuse of calcium fluoride is restricted by many related laws and regulations on uranium-containing matters. Thus, the reusability of the waste liquid is very low. Therefore, it is an important subject to avoid the coprecipitation of uranium and fluoride, but recycle uranium and fluoride from a waste liquid.

Traditional methods of recycling uranium and fluoride as disclosed in U.S. Pat. No. 4,256,702 and an article entitled "Recovery of uranium filtrate of ammonium diuranate prepared from uranium hexafluoride" and published by J. A. Seneda, et al in the Journal of Alloys and Compounds in 2001 can achieve the effect of removing uranium or fluoride. However, if these methods are applied to a waste liquid containing uranium and fluoride, then the coprecipitation will occur, and the methods cannot meet the requirement of removing uranium and fluoride separately. Another method as disclosed in U.S. Pat. No. 4,769,180 provides a way of removing fluoride and uranium separately by adding a magnesium (Mg) compound and sulfuric acid to neutralize a waste liquor, form a precipitate and then distill the formed precipitate in order to separate fluorine and uranium. However, this method requires distillation, and hydrofluoric acid (HF) will be produced in the distillation process. Hydrofluoric acid is an extremely strong corrosive agent having a very strong erosion capacity on silicon and silicon dioxide, thereby being able to corrode glass. In addition, hydrofluoric acid is highly poisonous and can be absorbed through a skin membrane, respiratory tract and gastrointestinal tract.

SUMMARY OF THE INVENTION

It is a primary objective of the present invention to overcome the aforementioned issues of the prior art by providing a separation and recycling method for recycling uranium and fluoride from a waste liquid sequentially and separately, such that the uranium and fluoride contents of the processed waste liquid comply with the effluent standards of related environmental laws.

Another objective of the present invention is to provide a separation and recycling method for recycling uranium and fluoride from a waste liquid sequentially and separately. The separation and recycling method comprises a uranium-recycling process and a fluoride-recycling process. In the uranium-recycling process, an alkali metal compound or monovalent cations is/are added into the waste liquid to promote the precipitation of uranium, and then a first coagulant aid is added into and uniformly mixed with the waste liquid to produce a uranium-containing precipitate in the waste liquid, and finally a uranium-containing precipitate is separated to obtain a uranium-removed waste liquid. In the fluoride-recycling process, an alkaline earth metal compound and a strong acid are added in the uranium-removed waste liquid to promote a precipitation of fluoride in the uranium-removed waste liquid, and then a second coagulant aid is added into and uniformly mixed with the uranium-removed waste liquid to produce a fluoride-containing precipitate in the uranium-removed waste liquid, and finally the fluoride-containing precipitate is separated to obtain a uranium-removed and fluoride-removed waste liquid.

In summation of the description above, the separation and recycling method for recycling uranium and fluoride from the waste liquid sequentially and separately in accordance with the present invention has one or more of the following advantages:

(1) The method of the present invention simply uses common chemicals and simple precipitation and filtration steps to achieve the effect of removing uranium and fluoride separately without requiring the distillation process. The invention can avoid generating a coprecipitate (such as a uranium and calcium fluoride coprecipitate) and hydrofluoric acid (HF) effectively to prevent secondary public hazards to environments and human beings.

(2) The waste liquid processed by the method of the present invention can comply with the effluent standards of related environmental laws and prevent environmental pollutions caused by an improper discharge or storage of waste liquids.

(3) The uranium-containing precipitate obtained by the method of the present invention can be further recycled and reused. For example, noble metal uranium can be recycled to save cost and avoid a waste of resources.

(4) The fluoride-containing precipitate obtained by the method of the present invention can be recycled and reused. For example, a calcium fluoride precipitate produced by a calcium compound and fluoride can be used as a cement material or an additive for porcelain or ceramic tiles.

DETAILED DESCRIPTION OF THE PREFERRED EMBODIMENTS

Figure 1:
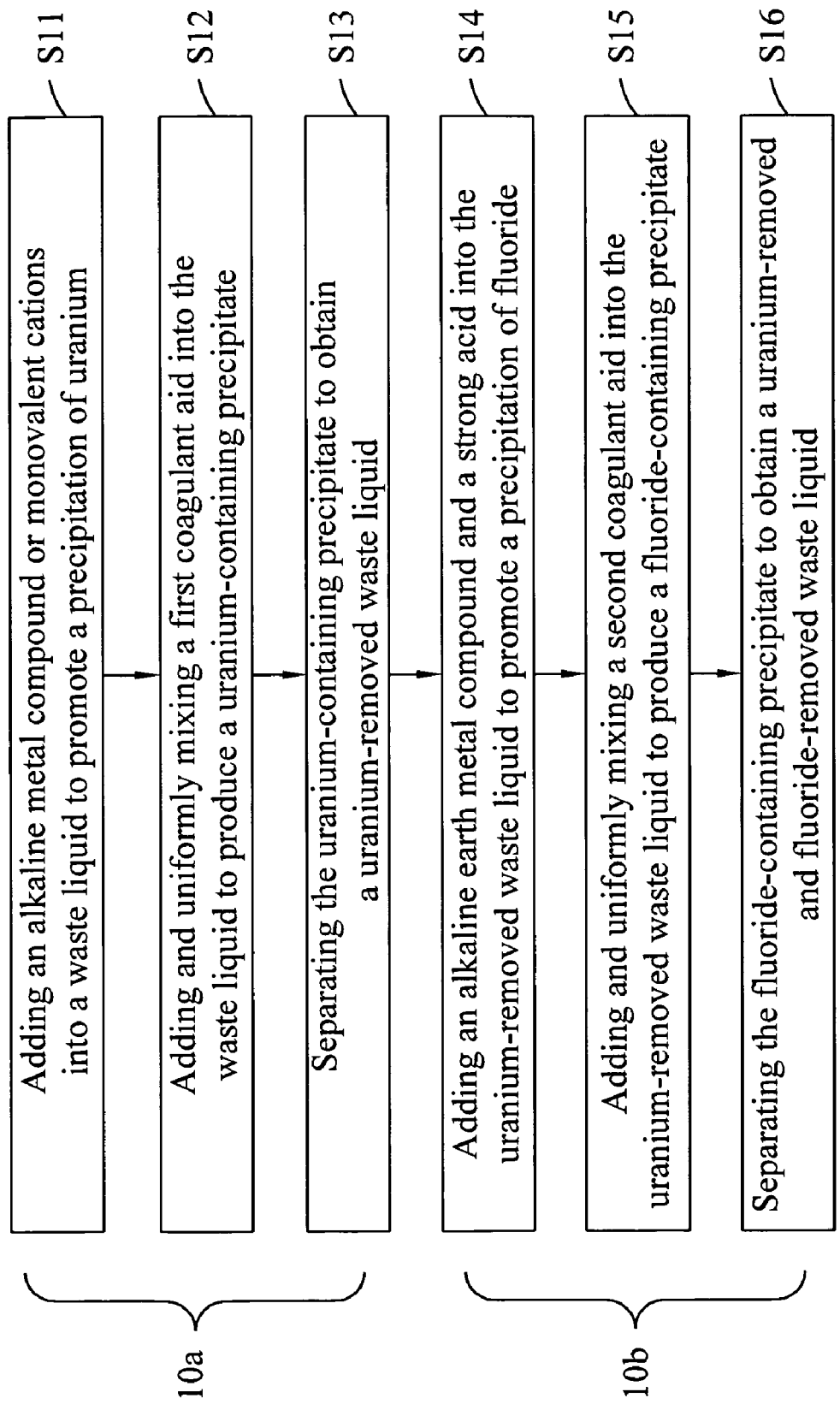
FIG. 1 is a flow chart of a separation and recycling method in accordance with a preferred embodiment of the present invention.

With reference to FIG. 1 for a flow chart of a separation and recycling method of the present invention, the separation and recycling method for recycling uranium and fluoride from a waste liquid sequentially and separately comprises two stages including a uranium-recycling process 10a and a fluoride-recycling process 10b. The uranium-recycling process 10a comprises the following steps. In step S11, an alkaline metal compound or monovalent cations is/are added into a waste liquid to promote a precipitation of uranium in the waste liquid. In step S12, a first coagulant aid is added into and uniformly mixed with the waste liquid to produce a uranium-containing precipitate in the waste liquid. In step S13, the uranium-containing precipitate is separated to obtain a uranium-removed waste liquid. The fluoride-recycling process 10b comprises the following steps. In step S14, an alkaline earth metal compound and a strong acid are added in the uranium-removed waste liquid to promote a precipitation of fluoride in the uranium-removed waste liquid. In step S15, a second coagulant aid is added into and uniformly mixed with the uranium-removed waste liquid to produce a fluoride-containing precipitate in the uranium-removed waste liquid. In step S16, the fluoride-containing precipitate is separated to obtain a uranium-removed and fluoride-removed waste liquid. In steps S11 and S14, the uranium-containing precipitate and the fluoride-containing precipitate are able to be produced, and the addition of the first coagulant aid and the second coagulant aid is used to respectively coagulate the uranium-containing precipitate and the fluoride-containing precipitate, so as to separate and recycle the uranium and fluoride in the waste liquid more quickly and more effectively.

In addition, the uranium-recycling process controls the pH value at approximately 8.0~14.0, and the fluoride-recycling process controls the pH value at approximately 6.5~10.0. The alkaline metal compound may be sodium hydroxide, and the alkaline earth metal compound may be calcium compound or magnesium compound. The calcium compound may be calcium hydroxide, calcium chloride, calcium oxide, calcium sulfate or a mixture of any combination of the above. The magnesium compound may be magnesium hydroxide, magnesium chloride, magnesium oxide, magnesium sulfate or a mixture of any combination of the above. The strong acid may be hydrochloric acid. The first coagulant aid and the second coagulant aid may be aluminum salts, ferric salts or polymers, and may also be activated carbon, ferric chloride, ferric sulfate, alum, polyaluminum chloride (PAC) or polyacrylamide (PAM).

Figure 2:
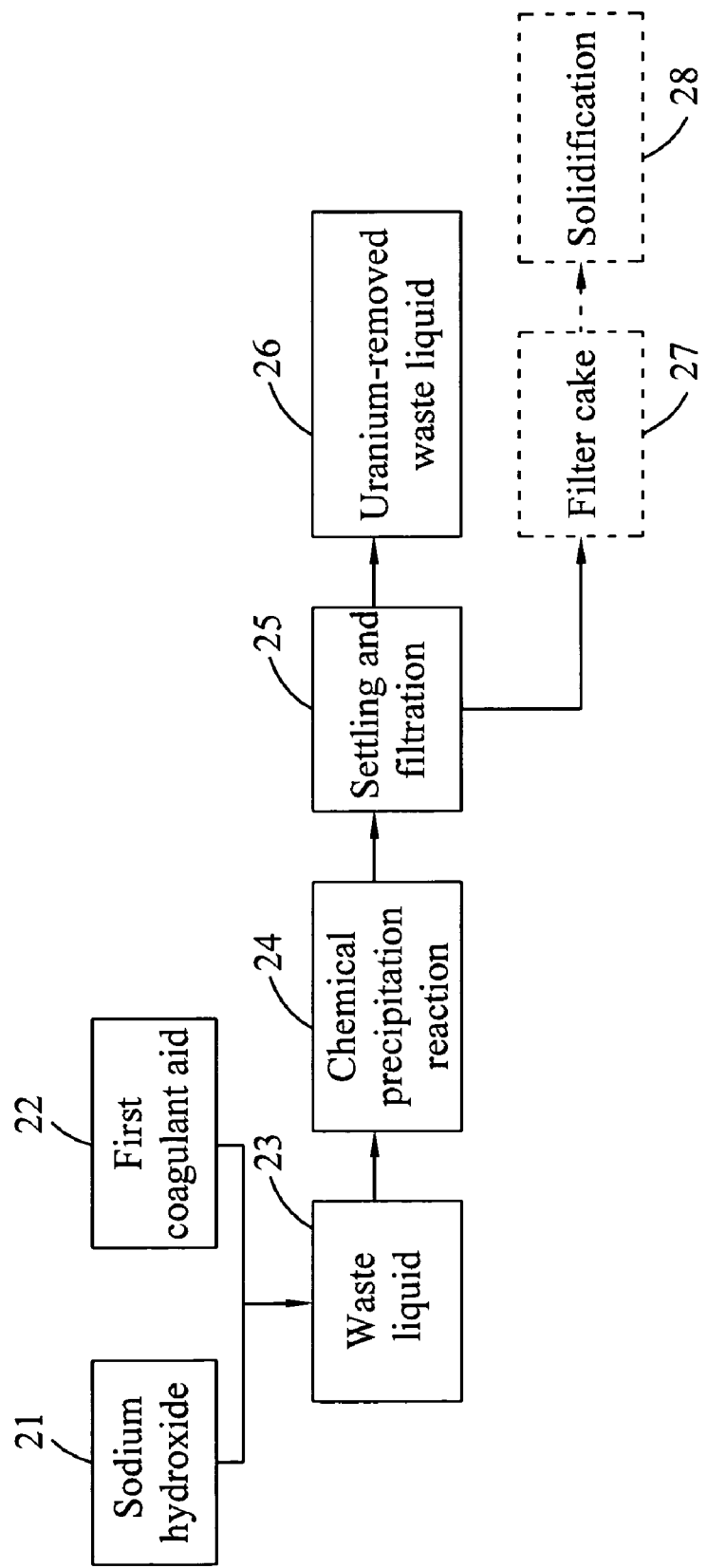
FIG. 2 is a flow chart of a uranium-recycling process of a separation and recycling method in accordance with a preferred embodiment of the present invention.
Figure 3:
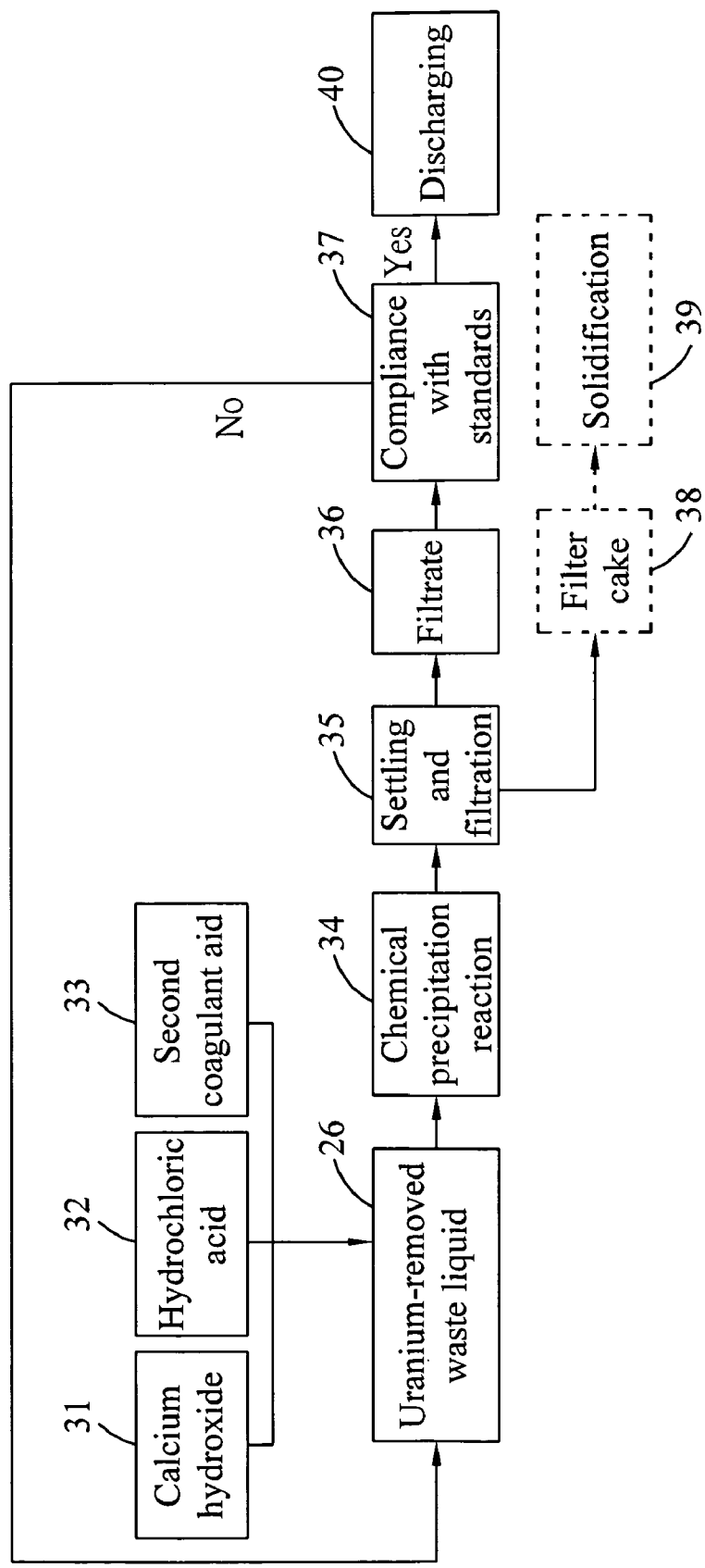
FIG. 3 is a flow chart of a fluoride-recycling process of a separation and recycling method in accordance with a preferred embodiment of the present invention.

With reference to FIGS. 2 and 3 for flow charts of a uranium-recycling process and an fluoride-recycling process of a separation and recycling method in accordance with preferred embodiments of the present invention respectively, the uranium-recycling process as shown in FIG. 2 comprises the following steps. Sodium hydroxide 21 and a first coagulant aid 22 (such as an aluminum salt, polyaluminum chloride, activated carbon) are added sequentially into a waste liquid containing uranium and fluoride 23 such that a chemical precipitation reaction 24 occurs. The waste liquid is settled and filtered 25. Subsequently, the uranium-removed waste liquid 26 is further processed. A solidification process 28 takes place for a filter cake 27 obtained by filtrating the obtained uranium-containing precipitate ($Na_2U_2O_7 \cdot xH_2O$, where x is a positive integer) to facilitate its storage, wherein filter paper and vacuum pump can be used for the filtration.

In the fluoride-recycling process as shown in FIG. 3, calcium hydroxide 31, hydrochloric acid 32 and a second coagulant aid 33 (such as aluminum salt, polyaluminum chloride or activated carbon) are added sequentially into a filtrate (which is the uranium-removed waste liquid 26) obtained by the method as illustrated in FIG. 2, and a chemical precipitation 34 takes place. In fact, the uranium-removed waste liquid 26 still has a trace of uranium. The waste liquid obtained from the aforementioned chemical precipitation reaction is settled and filtered 35. Subsequently, the filtrate 36 is further processed. The waste liquid is examined to check whether or not it complies with effluent standards 37. The waste liquid will be discharged 40 to the environment if it complies with the effluent standards. A filter cake 38 of the filtered fluoride-containing precipitate with a trace of uranium (calcium fluoride and a trace of $Na_2U_2O_7 \cdot xH_2O$) is solidified 39 to facilitate its storage. Wherein, the uranium-recycling process controls the pH value at approximately 8.0~14.0 and the fluoride-recycling process controls the pH value at approximately 6.5~10.0. A filter paper and vacuum pump are used for the filtration.

Figure 4:
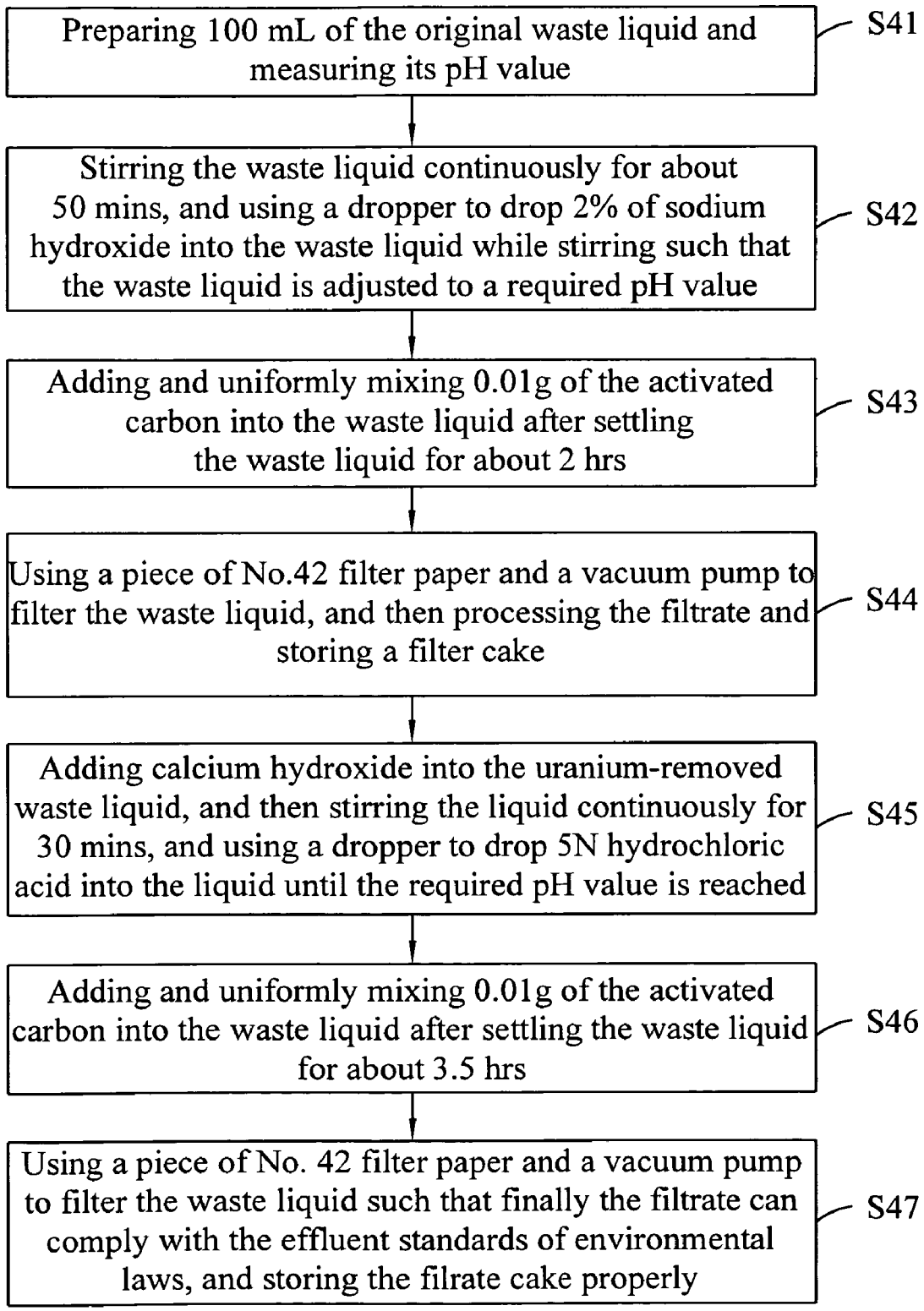
FIG. 4 is a flow chart of a separation and recycling method in accordance with another preferred embodiment of the present invention.

With reference to FIG. 4 for a flow chart of a separation and recycling method in accordance with another preferred embodiment of the present invention, the method includes (but not limited to) the following steps. In step S41, 100 mL of the original waste liquid is prepared and its pH value is measured. Herein, the original waste liquid used in this preferred embodiment comes from a laboratory, and the pH value is approximately equal to 7. Moreover, the uranium content is approximately equal to 1000 ppm, and the fluoride content is approximately equal to 1000 ppm. The solution is in a slight green color and no obvious precipitate is formed. In step S42, the waste liquid continuously is stirred continuously for approximately 50 minutes, and a dropper is used to drop 2% of sodium hydroxide into the waste liquid while stirring. The waste liquid is adjusted to a required pH value such as 10.0. In step S43, after settling the waste liquid for approximately 2 hours, 0.01 g of the activated carbon is added into and uniformly mixed with the waste liquid. In step S44, a piece of No. 42 filter paper and a vacuum pump are used to filter the waste liquid, then processing the filtrate and storing a filter cake. Wherein, the filtrate is a uranium-removed waste liquid with a pH value approximately equal to 9.5. The uranium content is about 0.75 ppm, and the fluoride content is about 1000 ppm. In step S45, calcium hydroxide is added into the uranium-removed waste liquid, then stirring the liquid continuously for 30 minutes, and dropping 5N hydrochloric acid into the liquid using a dropper until the required pH value is reached. Wherein, the concentration of hydrochloric acid is not limited, but it is easier to adjust the pH value (such as pH 8.0) by a low concentration of hydrochloric acid. In step S46, after settling the waste liquid for approximately 3.5 hours, 0.01 g of the activated carbon is added into and uniformly mixed with the waste liquid. In step S47, a piece of No. 42 filter paper and a vacuum pump are used to filter the waste liquid. The filtrate can comply with the effluent standards of environmental laws, and the filter cake is stored properly.

The pH value, uranium and fluoride contents, required stirring time, required settling time, and concentration and consumption of chemicals of an original waste liquid in accordance with a preferred embodiment of the present invention as shown in FIG. 4 are experiment data, and these data are different and can be adjusted according to the source of the original waste liquid or the desired processing quantity of the original waste liquid.

The result as shown in FIG. 4 indicates that the concentration of uranium in the processed waste liquid has dropped below 1E+05 $Bq/M^3$ (which complies with the radiation protection standard announced by the Atomic Energy Council), and the concentration of fluoride has dropped below 15 ppm (which complies with the effluent standard announced by the Environmental Protection Administration, Taiwan, R.O.C.). Thus the waste liquid in compliance with the effluent standard can be discharged safely to the environment. In addition, the filter cake can be recycled or stored safely to avoid secondary public hazards.

TABLE 1

Composition of Processed Waste Liquid Containing Uranium and Fluoride

| Item | pH value | Uranium (mg/L) | pH value | Fluoride (mg/L) |
|---|---|---|---|---|
| Original Waste Liquid | 6.8 | 898 | 6.8 | 1095 |
| Processed Waste Liquid | 8.0 | 52.5 | 8.0 | 8.4 |
|  | 9.0 | 2.0 |  | 11.4 |
|  | 10.0 | 0.78 |  | 12.4 |

Figure 5:
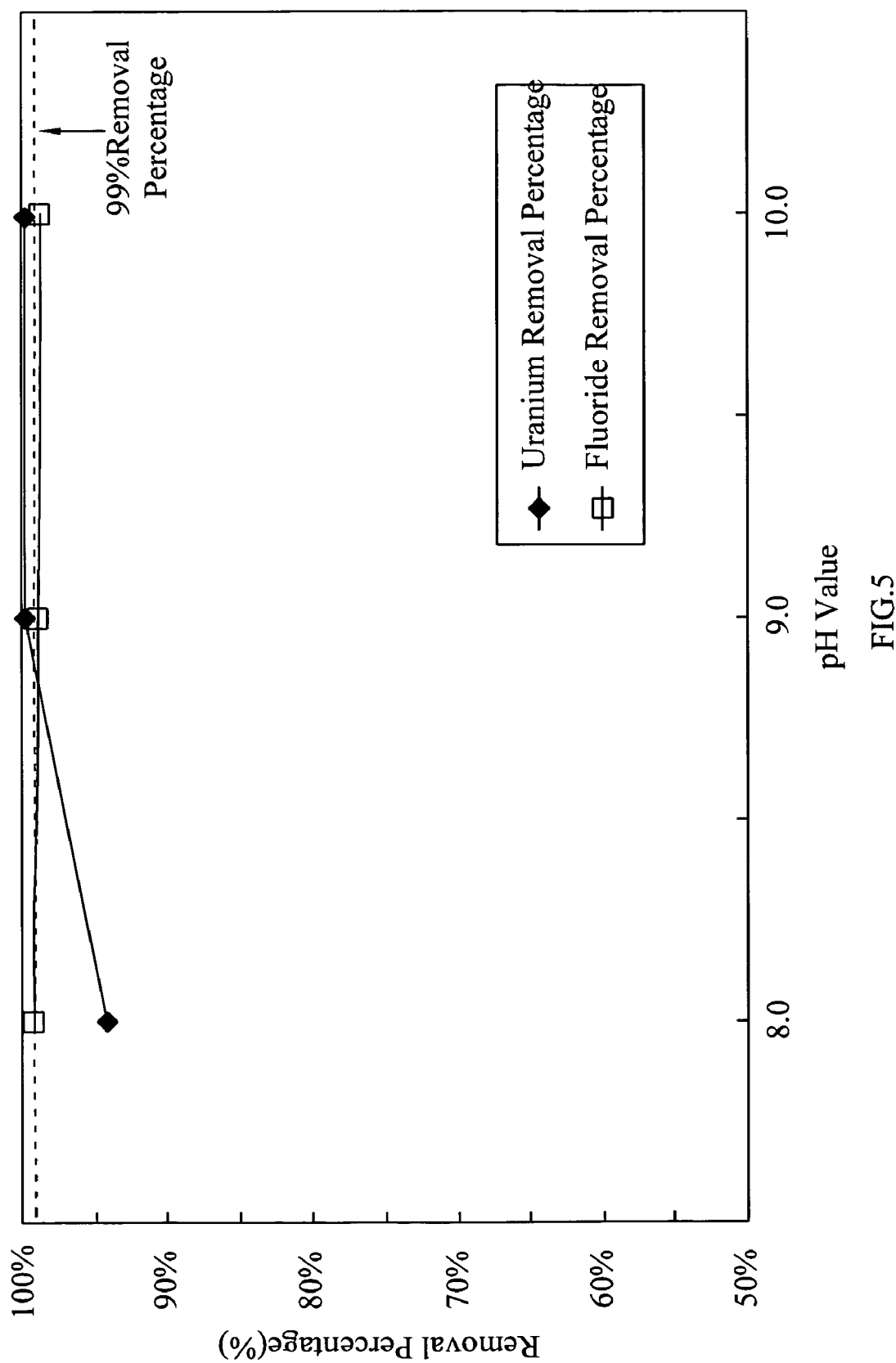
FIG. 5 is a graph of pH value versus removal percentage, after a waste liquid containing uranium and fluoride is processed in accordance with a preferred embodiment as illustrated in FIG. 4.

With reference to FIG. 5 for a graph of pH value versus removal percentage after a waste liquid containing uranium and fluoride is processed in accordance with a preferred embodiment as illustrated in FIG. 4, the higher the pH value, the better is the removal percentage of the removed uranium in the waste liquid. However, the best removal percentage occurs only if the pH value of fluoride in the waste liquid is equal to 8, and the higher the pH value of fluoride, the lower is the removal percentage.

While the invention has been described by means of specific embodiments, numerous modifications and variations could be made thereto by those skilled in the art without departing from the scope and spirit of the invention set forth in the claims.

What is claimed is:

1. A separation and recycling method, for recycling uranium and fluoride from a waste liquid, comprising:
   a uranium-recycling process, comprising the steps of:
      adding an alkaline metal compound or monovalent cations into the waste liquid to promote a precipitation of the uranium in the waste liquid;
      adding and uniformly mixing a first coagulant aid into the waste liquid to obtain a uranium-containing precipitate in the waste liquid; and
      separating the uranium-containing precipitate to obtain a U-removed waste liquid; and
   a fluoride-recycling process, comprising:
      adding an alkaline earth metal compound and a strong acid into the uranium-removed waste liquid to promote a precipitation of the fluoride in the uranium-removed waste liquid;
      adding and uniformly mixing a second coagulant aid in the uranium-removed waste liquid to obtain a fluoride-containing precipitate; and
      separating the fluoride-containing precipitate to obtain a uranium-removed and fluoride-removed waste liquid.

2. The separation and recycling method of claim 1, wherein the uranium-recycling process controls a pH value at approximately 8.0~14.0.

3. The separation and recycling method of claim 1, wherein the fluoride-recycling process controls a pH value at approximately 6.5~10.0.

4. The separation and recycling method of claim 1, wherein the alkaline metal compound comprises sodium hydroxide.

5. The separation and recycling method of claim 1, wherein the alkaline earth metal compound comprises a calcium compound or a magnesium compound.

6. The separation and recycling method of claim 5, wherein the calcium compound comprises calcium hydroxide, calcium chloride, calcium oxide, calcium sulfate or a mixture of any combination of the above.

7. The separation and recycling method of claim 5, wherein the magnesium compound comprises magnesium hydroxide, magnesium chloride, magnesium oxide, magnesium sulfate or a mixture of any combination of the above.

8. The separation and recycling method of claim 1, wherein the strong acid comprises hydrochloric acid.

9. The separation and recycling method of claim 1, wherein the first coagulant aid comprises an aluminum salt, a ferric salt or a polymer.

10. The separation and recycling method of claim 1, wherein the first coagulant aid comprises activated carbon, ferric chloride, ferric sulfate, alum, polyaluminum chloride or polyacrylamide.

11. The separation and recycling method of claim 1, wherein the second coagulant aid comprises an aluminum salt, a ferric salt or a polymer.

12. The separation and recycling method of claim 1, wherein the second coagulant aid comprises activated carbon, ferric chloride, ferric sulfate, alum, polyaluminum chloride or polyacrylamide.

* * * * *